(12) United States Patent
Asmi et al.

(10) Patent No.: US 7,739,317 B2
(45) Date of Patent: Jun. 15, 2010

(54) DATA SERIALIZATION AND TRANSFER

(75) Inventors: Yasser Asmi, Redmond, WA (US); Mark D. Zuber, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 232 days.

(21) Appl. No.: 11/558,660

(22) Filed: Nov. 10, 2006

(65) Prior Publication Data

US 2008/0114766 A1 May 15, 2008

(51) Int. Cl.
- G06F 7/00 (2006.01)
- G06F 17/30 (2006.01)
- G06F 12/00 (2006.01)
- G06F 15/16 (2006.01)

(52) U.S. Cl. .................. 707/829; 707/793; 709/231
(58) Field of Classification Search ............. 707/8, 707/100; 709/230, 231
See application file for complete search history.

(56) References Cited

U.S. PATENT DOCUMENTS

| | | | |
|---|---|---|---|
| 5,809,145 A * | 9/1998 | Slik et al. ............... 705/52 |
| 6,023,715 A * | 2/2000 | Burkes et al. ............ 715/207 |
| 6,196,393 B1 * | 3/2001 | Kruk et al. .............. 209/630 |
| 6,389,402 B1 | 5/2002 | Ginter et al. |
| 6,594,692 B1 | 7/2003 | Reisman |
| 6,609,128 B1 | 8/2003 | Underwood |
| 6,694,372 B1 | 2/2004 | Grossman |
| 6,874,130 B1 * | 3/2005 | Baweja et al. ........... 715/805 |
| 7,111,016 B2 | 9/2006 | Gurevich |
| 2002/0026645 A1 | 2/2002 | Son et al. |
| 2002/0129022 A1 * | 9/2002 | Majewski et al. ........ 707/10 |
| 2003/0018978 A1 * | 1/2003 | Singal et al. ............ 725/115 |
| 2003/0025832 A1 | 2/2003 | Swart et al. |
| 2003/0084180 A1 * | 5/2003 | Azami ................... 709/231 |
| 2003/0120928 A1 * | 6/2003 | Cato et al. .............. 713/176 |
| 2003/0236912 A1 * | 12/2003 | Klemets et al. .......... 709/236 |
| 2004/0117442 A1 * | 6/2004 | Thielen .................. 709/203 |
| 2004/0154039 A1 | 8/2004 | Simms et al. |
| 2004/0243736 A1 | 12/2004 | Hattrup et al. |
| 2005/0165795 A1 | 7/2005 | Myka et al. |
| 2005/0166140 A1 * | 7/2005 | Cai et al. ............... 715/513 |
| 2005/0275752 A1 | 12/2005 | Li et al. |
| 2006/0029093 A1 | 2/2006 | Van Rossum |
| 2006/0143303 A1 | 6/2006 | Serenyi et al. |
| 2006/0156375 A1 | 7/2006 | Konetski |
| 2006/0218618 A1 * | 9/2006 | Lorkovic ................ 725/135 |

OTHER PUBLICATIONS

Abu-Ghazaleh et al. "Differential Serialization for Optimized SOAP Performance". Proceedings of the 13th Int'l Symposium on High Performance Distributed Computing, pp. 55-64, Jun. 2004.*

(Continued)

*Primary Examiner*—Apu M Mofiz
*Assistant Examiner*—Charles E Lu
(74) *Attorney, Agent, or Firm*—Marshall, Gerstein & Borun LLP (57) ABSTRACT

A transfer protocol for sending data between a source device and a receiving device uses hierarchical metadata to establish relationships between content files and content metadata so that after an initial element is received, subsequent elements, be they files or metadata, have a defined relationship to a previously sent element.

20 Claims, 5 Drawing Sheets

OTHER PUBLICATIONS

International Search Report for PCT/US2007/083556 mailed Feb. 29, 2008.

Written Opinion for PCT/US2007/083556 mailed Feb. 29, 2008.

Candan et al., "Collaborative Multimedia Systems Synthesis of Media Objects," http://www.cs.umd.edu/projects/hemes/publications/postscripts/cmssmo.ps.

Gajewska et al., "Argo: A System for Distributed Collaboration," http://www.std.org/~msm/common/gajarg.pdf.

* cited by examiner

DATA SERIALIZATION AND TRANSFER

BACKGROUND

Media devices are in common use among a broad base of users. Radio and television have provided entertainment for generations of users. Portable transistor radios of the 1960s began a trend to smaller and more robust personal media devices including very small devices storing all digital content on both rotating and non-rotating media. Streaming media is available over both wireless and wired networks and may be displayed on cellular telephones and other portable media devices.

File transfer among devices of all kinds is known and understood. Different protocols, such as file transfer protocol (FTP), establish the protocol for sending a file between two systems. Other protocols, such as extended markup language (XML) or ISO 7816 application protocol data units (APDU) allow for name/value pairs of data that allow a definition of the data to be sent with data. However, protocols such as ISO 7816 require hexadecimal tags that require machine interpretation. Similarly, XML often requires a separate XML schema definition (XSD) file to be sent separately from an associated XML file. While data contents are defined by these protocols, relationships between files or other data elements are not defined by existing file transfer protocols, requiring a priori information about data relationships.

SUMMARY

A transfer protocol for sending data between a source device and a receiving device uses hierarchical metadata to establish relationships between content files and content metadata so that after an initial element is received, subsequent elements, be they files or metadata, have a defined relationship to a previously sent element. This reduces the time and processing required at the receiving end because relationship information does not have to be derived and the associated data subsequently organized when receiving content. The metadata may also define how to handle the received information, for example, whether to display the final content or whether a received item should be counted against a total of items.

The protocol is string-based, allowing compatibility with a wide range of underlying transports as well as allowing simple parsing using readily available string management programming tools.

The source and receiving media devices may include a handheld device, a virtual player on a computer, a set-top box, a cellular telephone, or other device capable of supporting media objects, a user interface, and in many cases, external communication.

DETAILED DESCRIPTION

Figure 1:
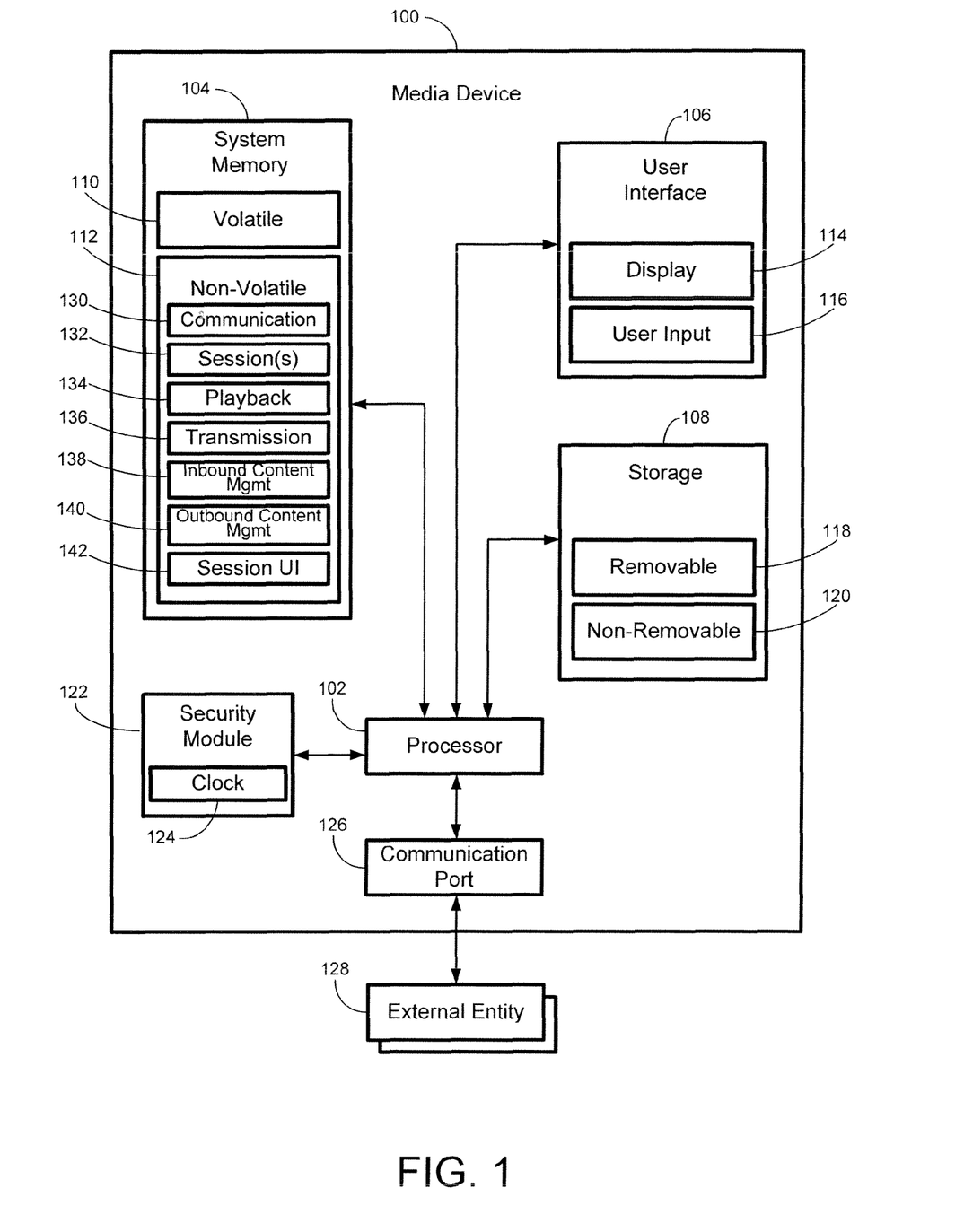
FIG. 1 is a simplified and representative block diagram of a portable media device.

FIG. 1 is an illustration of exemplary hardware that may be used for a media device 100 that may provide effective DRM for media objects transferred between devices by managing the device inbox. The media device 100 may have a processing unit 102, a memory 104, a user interface 106, a storage device 108 and a power source (not shown). The memory 104 may include volatile memory 110 (such as RAM), non-volatile memory 112 (such as ROM, flash memory, etc.) or some combination of the two.

The media device 100 may also include additional storage 108 (removable and/or non-removable) including, but not limited to, magnetic or optical disks or tape or any other memory that can be easily rewritten, may keep data for long periods of time when power is removed, and may allow quick and efficient access to data. Such additional storage is illustrated in FIG. 1 by removable storage 118 and non-removable storage 120. Computer storage media includes volatile and nonvolatile, removable and non-removable media implemented in any method or technology for storage of information such as computer readable instructions, data structures, program modules, digital media, or other data. Memory 104, removable storage 118, and non-removable storage 120 are all examples of computer storage media. Computer storage media includes, but is not limited to, RAM, ROM, EEPROM, flash memory or other memory technology. Any such computer storage media may be part of device 100.

The processing unit 102 may be any processing unit 102 capable of executing computer code to decode media data from a compressed format into a useable form fast enough such that music and video may be played continuously without skips or jumps. When in a portable media device, it may also be useful if the processor 102 efficiently uses power to increase the life of the power source. The processing unit 102 may also be used to execute code to support a user interface and external communications.

The user interface 106 may include one or more displays 114 for both displaying control information and displaying viewable media. The display 114 may be a color LCD screen that fits inside the device 100. User input(s) 116 may include either manual buttons, soft buttons, or a combination of both. Soft buttons may be used when the display 114 includes a touch screen capability. Manual buttons may include re-definable keys with programmable legends.

A security module 122 may be coupled to the processor. The security module 122 may be used to store cryptographic keys used in digital rights management (DRM). The security module 122 may also have specialized hardware or processors for performing cryptographic calculations, such as stream decryption, without burdening the processor 102. Lastly, the security module 122 may include secure memory for storing record data associated with limited use rights for received media objects. The security module 122 may also include a tamper resistant clock 124 for determining expiration periods on licenses. Management of limited use rights for media objects is discussed in more detail below.

The media device 100 may also contain a communications port 126 that allow the device 100 to communicate with external entities 128, such as network endpoints, other media devices, network access points, or a computer used for synchronization. The communication port 126 is an example of communication media.

A variety of functions, implemented in logic or software, may be used to support both inbound and outbound DJ sessions. Such functions may include a communication module 130, inbound and outbound session modules 132, a playback module 134, a transmission module 136, inbound 138 and outbound 140 content management modules for creating records regarding streaming content sessions. Additionally, a session user interface 142, incorporating a special user itierface and text communication modules may support user interaction related to initiating and supporting DJ sessions, including communication between connected users during a DJ session.

The power source may be a battery that may be rechargeable. The power source may also be a standard battery or an input from a power converter.

In operation, a user may connect to external entities 128 through a variety of network types to include local and wide area networks using any number of communication protocols and standards. For example, a media device may connect to a network implementing any of the Ethernet, ARCNet, FDDI, IEEE 1394, Token Ring, or TCP/IP standards. Additionally, the media device 100 may also connect via a wireless connection, such as an IEEE 802.11 wireless connection. Media devices may connect to each other through a central access point or in an ad hoc fashion. Once connected, the devices may share and transfer data files including media content. A user may receive a media object, including, for example, music or video content, over the communication port 126. In one embodiment, the media object may be sent over an ad-hoc wireless network from the external device 128. To illustrate, the media object may have been purchased for use on the external device 128 and the user of the external device 128 may be entitled to full and unlimited access to that media object using that device. The user of the external device may wish to send the media object to a user of the media device 100. When sharing a media object, the protocol described below may be used to facilitate the transfer. The media object may be a single item, for example a song, or may include several items, such as an album with many individual songs. The media object may not be restricted to music, but may include, together or separately, videos, photos, text, audio books, presentations, self-guided tours, or others. Other objects may be shared such as text files, applications, applets, etc.

Figure 2:
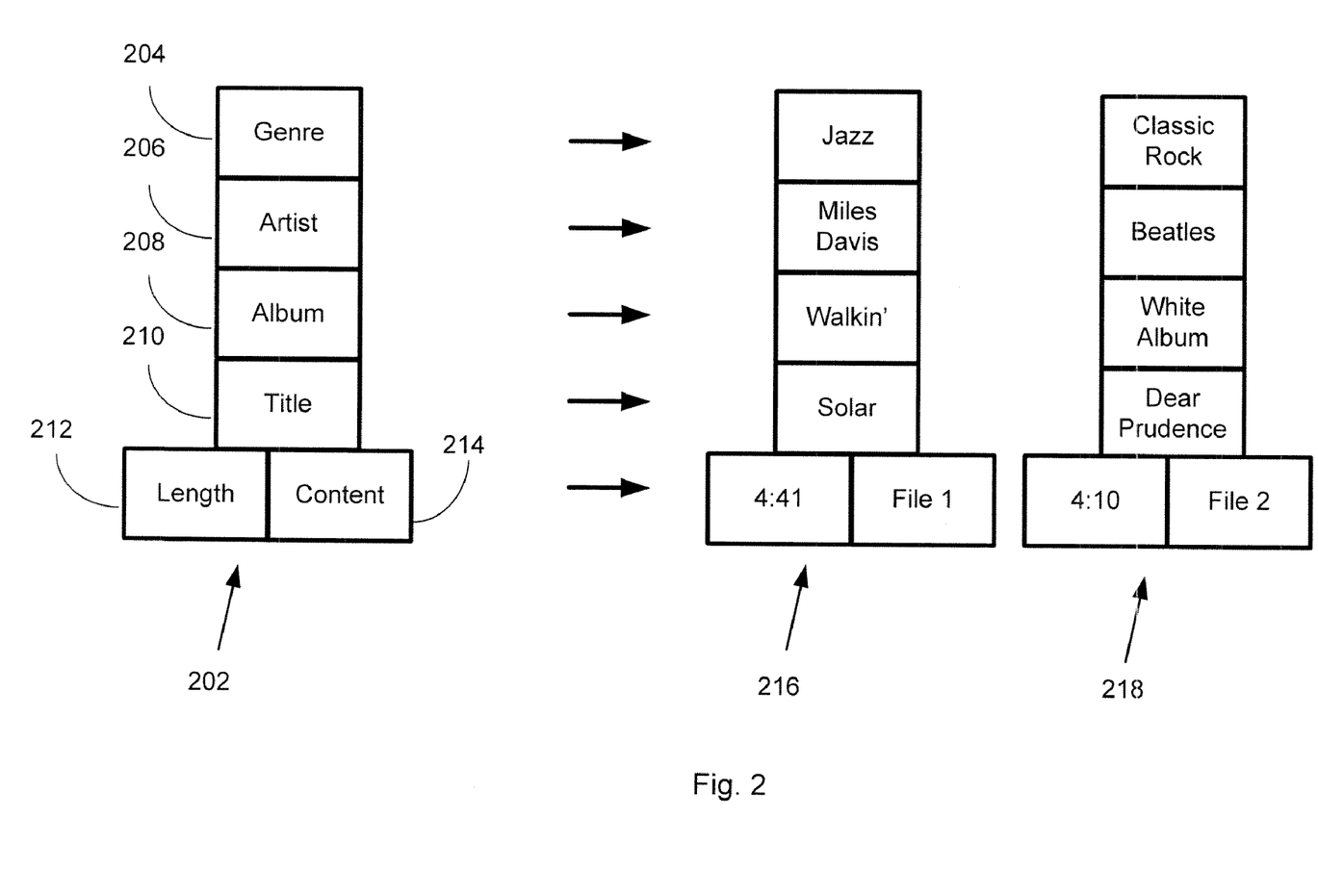
FIG. 2 is a block diagram of a media hierarchy.

FIG. 2 is an illustration of hierarchical metadata and content for an exemplary media object 202, such as a song. The exemplary media object 202 contains, at the highest level, a genre designation 204, followed by artist 206, album 208, and title 210. Items associated with the title 210 may be organized under the title layer, such as shown by length information 212 and the actual song content, for example, an MP3 file 214. Specific examples that illustrate this hierarchical metadata organization are a jazz song 216, 'Solar' by Miles Davis and a classic rock song 218, the Beatles 'Dear Prudence.' Similar hierarchical metadata would be stored for other media and data types. The hierarchy may be set in advance, may be selected automatically based on the object type, may be selected by setting a bit, or may be modified by a user, a data owner, an authority or the like.

Figure 3:
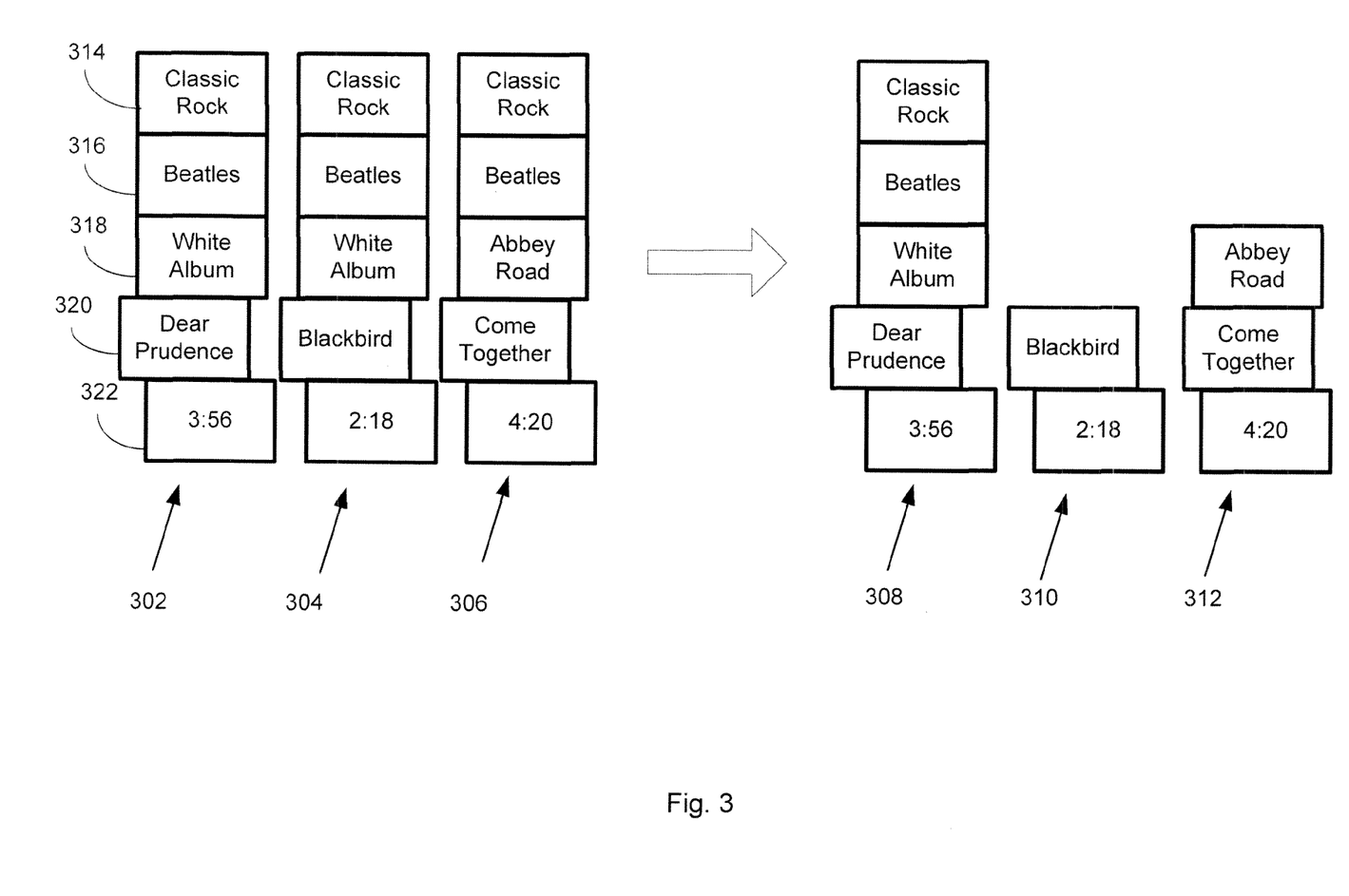
FIG. 3 is a block diagram of an embodiment of the media hierarchy of FIG. 2.

FIG. 3 illustrates the media hierarchy of FIG. 2 showing a collection of songs from the Beatles. The three songs illustrated are 'Dear Prudence' 302, 'Blackbird' 304, and 'Come Together' 306. Only metadata is shown for convenience of the illustration (the associated content files are not shown). FIG. 3 further illustrates how duplicate entries at a layer of the hierarchy may be removed to save transmission time and clutter. The metadata stack associated with song 'Dear Prudence' 302 may not change when a duplicate removal process (discussed in more detail below with respect to FIG. 4.) is initiated. The result after duplicate removal, as applied to the collection, is media hierarchy 308, the same as media hierarchy 302. However, the duplicate removal process, when applied to the song 'Blackbird' 310 removes the genre layer 314, the artist layer 316, and the album layer 318, leaving only the title layer 320 and length 322, both dependent from the album layer 318. The duplicate removal of 'Come Together' 312, likewise removes the genre layer 314, and artist layer 316, but because the album is different from song 302, the album designation 'Abbey Road' is left at the album layer 318.

Figure 4:
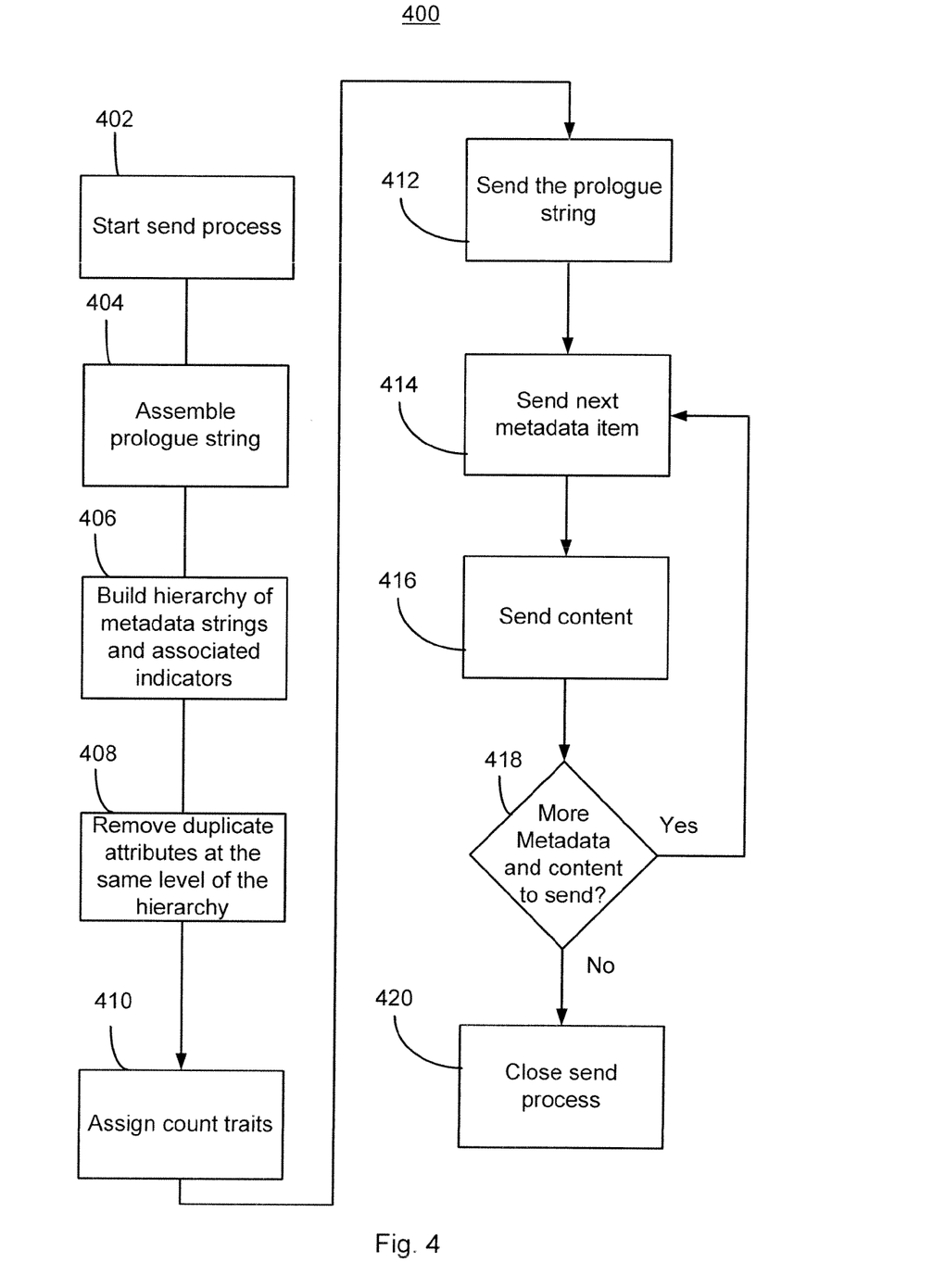
FIG. 4 illustrates a method 400 of preparing and sending hierarchical metadata and associated content files for transmission to a receiving or destination device.

FIG. 4 illustrates a method 400 of preparing and sending hierarchical metadata and associated content files for transmission to a receiving or destination device, such as external entity 128 of FIG. 1. At block 402, the send process may be initiated, for example, in response to a request entered via user interface 106 of FIG. 1. In one embodiment, a CMetaXferSender::Initialize( ) method may be called to set a library interface for use during the session. A CMetaXferSender::CreateSession( ) method may be called and passed a high level identifier of the root item to send, for example, a HMEDIAITEM of the root item, as well as an identifier of the destination device. In one embodiment, a media card that has been received from the destination device may be used as the identifier. The media card may include not only human-readable information for the user, such as a user's nickname and favorites, but virtually any information, such as machine-readable information, including, for example, a global unique identifier and local network identifier.

At block 404, a command, such as CMetaXferSender::EncodeSendPrologue( ), may be called to retrieve and assemble an initial, or prologue, string. The prologue string may include the root item type and the number of items to count. The root item type may define a metadata stack for that root item type. In the example of an album, the root item may define a metadata stack such as that shown in FIG. 2. An audio book may be sent chapter by chapter, or a music video may be sent as a single file with appropriate metadata. Because more than one item may be sent for each content item, a count may be included in the prologue string so that the receiving device can display a progress bar or count, e.g. "x of y". For example, an album may include 8 songs, each song having 2-5 metadata layers and one content file. The count may be set to 9, one for the album cover art and one for each song even though thirty or more individual items may be sent.

At block 406, a hierarchy of metadata strings and associated content files may be assembled. The metadata stacks 216 and 218 of FIG. 2 are exemplary of this step. Also at this step, each element of each metadata stack may be noted as being countable or not-countable. That is, when an individual element is received, should the media player increment the progress bar such as "x of y."

At block 408, duplicate attributes at the same hierarchy levels may be removed by searching through metadata elements to find duplicates. In one embodiment, a reference in a second lower-level item to a higher-level item may be changed to point to an adjacent higher-level item. In another embodiment, as each duplicate item has an equivalent name/value pair designator, the duplicate may simply be deleted and the lower-level item will still point to the remaining name/value pair. Other manners and embodiments of referencing duplicate information are possible.

The following strings are used to illustrate the concept of name/value pairs and duplicate deletion. The character "|" is used as a name/value pair separator, and the character "=" is used to separate name and value within the name/value pair. In this example, the encoding for items is:

METAXFER_ENCODE_HMEDIAITEM="HMI"
METAXFER_ENCODE_MEDIAITEMROOT=
    "HMIROOT"
METAXFER_ENCODE_MEIDIAITEMTYPE=
    "MITYPE"
METAXFER_ENCODE_RELATION="REL"
A sample metadata stack with duplicates may be:
"HMI=12345|MITYPE=1111|NAME=Rock"
"HMI=22425|MITYPE=2222|NAME=Pink
    Floyd|REL=12345"
"HMI=33241|MITYPE=3333|NAME=The
    Wall|REL=12345|REL=22425"
"HMI=52206|MITYPE=4444|NAME=Another Brick in
    the Wall|REL=12345|REL=22425|REL=33241"
"HMI=66024|MITYPE=4444|NAME=Mother|REL=
    12345|REL=22425|REL=33241"

HMI is a unique item identifier, MITYPE=1111 is Genre, MITYPE=2222 is Artist, MITYPE=3333 is Album, and MITYPE=4444 is song. The genre is rock, the artist is Pink Floyd, the album is The Wall, and two songs are Another Brick in the Wall and Mother. The string identifiers each have a relationship referenced to at least one previous item. When sent in a top-down order, an item after the first item will have at least one relationship to a higher level item. This greatly simplifies reconstruction of a schema for holding this metadata stack and its associated content files without the need for XSD or other schema definitions. Because all the descriptions are strings, the parsing is straightforward and may use string manipulation commands available in virtually all programming languages.

The MITYPE=44444 is duplicated in the last two entries. The second MITYPE=44444 may be removed to save space, and ultimately, lower transmission time and extend battery life. The processed metadata stack could be reduced to:
"HMI=12345|MITYPE=1111|NAME=Rock"
"HMI=22425|MITYPE=2222|NAME=Pink
    Floyd|REL=12345"
"HMI=33241|MITYPE=3333|NAME=The
    Wall|REL=12345|REL=22425"
"HMI=52206|MITYPE=4444|NAME=Another Brick in
    the Wall|REL=12345|REL=22425|REL=33241"
"HMI=66024|NAME=Mother|REL=12345|REL=22425|
    REL=33241"

An item with a missing MITYPE would default to either the one above it, or that of a previously sent element with the same relationships. Certainly, other embodiments of referencing duplicate data are possible.

At block 410, each element of each metadata stack may be noted as being countable or not-countable. That is, when an individual element is received, whether the progress bar or "x of y" count should be incremented may be indicated. An additional MITYPE=55555 may be used to contain a pathname to a content file and MITYPE=66666 may be the count/not count designation. An additional line in the above metadata stack could then be: [0046]
"HMI=66311|MITYPE=55555|PATHNAME='c:\my
music\mother.mp3'|COUNT=Truc|REL=66024

In actual practice, the use of separators with text value as shown above may be impractical because the separator may appear in one of the value elements, but are used in illustration.

A block 412, the prologue string may be sent to the receiving device. Activity on the receiving device will be discussed with respect to FIG. 5. At block 414, a method may be called to obtain a list of metadata, content, or both to send next. For example, a method CMetaXferSender::GetNextSendContent( ) may be used for this function in one embodiment. The method may also return the count status of the item. At block 416, the item retrieved at block 414 may be sent to the receiving device. If the data includes a file path to a location of local content, as above, the file path may be sent to the receiving device even though the receiving device will establish its own target destination. After sending the file path, the content pointed to the by the file path may be sent.

At block 418 a determination is made if there is additional items to send. In the exemplary embodiment, the CMetaXferSender::GetNextSendContent( ) may return a value of S_FALSE when there are no more items to send. If there are more items to send, processing may follow the Yes branch from block 418 and the process may continue again at block 414. If there is no more data to send, the No branch from block 418 may be followed to block 420 and the send process may be closed.

Figure 5:
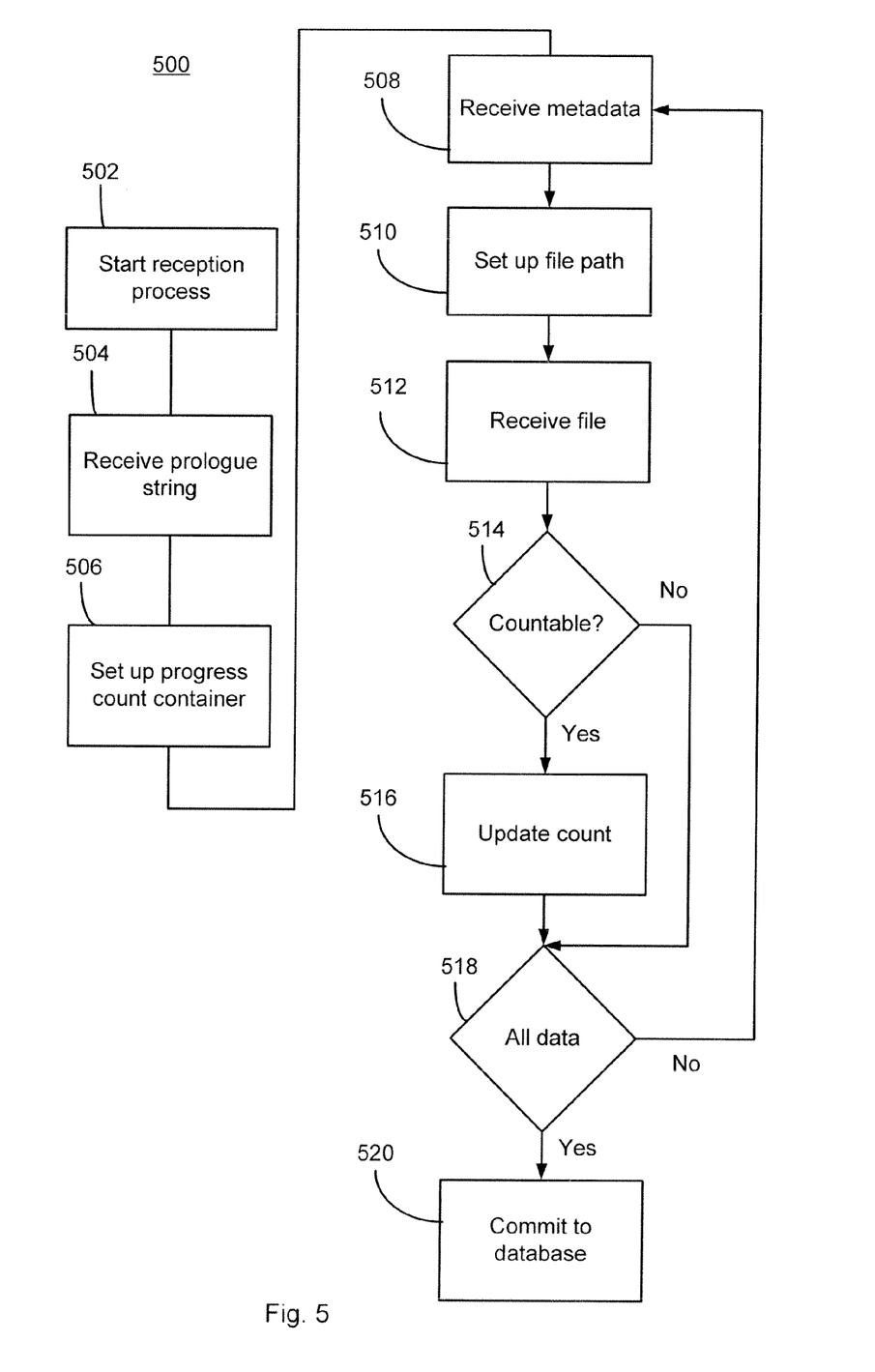
FIG. 5 is a method 500 illustrating an exemplary embodiment of receiving hierarchical metadata and associated content at a receiving device.

FIG. 5 is a method 500 illustrating an exemplary embodiment of receiving hierarchical metadata and associated content at a receiving device. At block 502, a reception process may be initiated at the receiving device, for example, responsive to a signal received via a port, such as communication port 126 of FIG. 1, and, optionally, after approval by a user. In an exemplary embodiment, a CMetaXferReceiver::Initialize( ) command may initiate the reception process and load one or more appropriate libraries.

At block 504, the prologue string may be received and parsed to its component parts at block 506, including the media card, or other identifier, of the sender from the transport protocol. The media item identifier of the object being passed may then be captured as well as the type and count for setting up the receive framework. In one embodiment, the calls CMetaXferReceiver::GetSendPrologueMediaItemType( ) and CMetaXferReceiver::GetSendPrologueItemProgressCount( ) may be used to extract these parameters from the prologue string. An exemplary prologue string may include a media item type and count as follows:
"SP_MITYPE=6|SP_ICNT=10"

At block 508, after the prologue string has been processed, metadata and content data may be received. The order may be sequential corresponding to the send process on the sending device, as described above. In the exemplary embodiment, a CMetaXferReceiver::AddMetaData( ) method may be called to extract metadata. At block 510, when the data includes a file path item, the receiving device may set up a receive file path and, at block 512, receive the corresponding file, for example, a media binary, such as an MP3 audio or WMV video file. In the exemplary embodiment, a CMetaXferReceiver::BeginAddFileContent( ) method may be used.

At block 514, if the item is countable, the yes branch may be followed to block 516 and the count may be updated and reflected on a progress indicator (not depicted) on the user interface. If, at block 514, the received item is not countable, the no branch from block 514 may be followed, and the update count block 516 may be bypassed. At block 518, if more data is pending, the No branch from block 518 may be followed to block 508 (or block 510 or block 512, depending on the item), and the item reception process may be repeated. When, at block 518, all data has been received, the Yes branch from block 518 may be followed to block 520. At block 520, the received data may be committed to a local database or other storage. Because the relationship information is received with each item and because all items after the first have a defined relationship to at least one previous item, the schema for the data is self-defining, without reference to external schema references or look-up tables.

A partial list of attributes may be used to describe the item being sent. Not all attributes apply to every media type, nor is the following list exhaustive.

METAXFER_ENCODE_MIATTR_URL="URL";
METAXFER_ENCODE_MIATTR_NAME="NAME";
METAXFER_ENCODE_MIATTR_ARTIST="ARTIST";
METAXFER_ENCODE_MIATTR_ALBUM="ALBUM";
METAXFER_ENCODE_MIATTR_GENRE="GENRE";
METAXFER_ENCODE_MIATTR_TRACKNUMBER= "TRACK NUMBER";
METAXFER_ENCODE_MIATTR_COPYRIGHT= "COPYRIGHT";
METAXFER_ENCODE_MIATTR_SOURCE= "SOURCE";
METAXFER_ENCODE_MIATTR_PARENTALRA- TING="PARENTAL RATING";
METAXFER_ENCODE_MIATTR_FIVESTARRA- TING="STAR RATING";
METAXEER_ENCODE_MIATTR_PLAYCOUNT= "PLAY COUNT";
METAXFER_ENCODE_MIATTR_CHANNEL- NUMBER="CHIANNEL NUMBER";
METAXFER_ENCODE_MIATTR_ORIGINALDATE= "ORIGIATION DATE";
METAXFER_ENCODE_MIATTR_SYNCDATE= "SYNCHRONIZATION DATE";
METAXFER_ENCODE_MIATTR_DURATION= "DURATION";
METAXFER_ENCODE_MIATTR_PICTURE= "PIC- TURE";
METAXFER_ENCODE_MIATTR_WIDTH="WIDTH";
METAXFER_ENCODE_MIATTR_HEIGHT= "HEIGHT";
METAXFER_ENCODE_MIATTR_DESCRIPTION= "ITEM DESCRIPTION";
METAXFER_ENCODE_MIATTR_FORMAT= "FOR- MAT";
METAXFER_ENCODE_MIATTR_INDEX="INDEX";
METAXFER_ENCODE_MIATTR_DISPLAYURL= "DISPLAY URL";
METAXFER_ENCODE_MIATTR_SORTKEY="SORT KEY";
METAXFER_ENCODE_MIATTR_HIDDEN= "HID- DEN";
METAXFER_ENCODE_MIATTR_CRUXTAG= "STOCKING KIT UNIT";

Most of the above attributes are self-explanatory. The parental rating is a code that may be used in conjunction with a rating set by parents to control content that is allowed on an individual media device. For example, a media device may be set to not accept violent games and movies with an "R" or higher rating. The parental rating code may be set by the content provider corresponding to the rating system used by that product type. The hidden attribute may be used when an item is being sent for which local rights must first be obtained before the item may be accessed. The user may be notified of an item's presence, but may not be allowed to access the item until those rights are separately obtained.

The use of a self-organizing, text coding for object transfer between devices allows virtually any kind of object to be sent including complete and appropriate descriptive information. No external schema files or references must be sent or stored. Little, if any, a priori information is required for the receiving device to arrange and organize incoming information for commitment to a local database. The use of metadata duplicates removal saves time and transmission overhead by eliminating redundant data. Simple text parsing tools can be used to extract the required information. Overall, content providers, device manufacturers, and end users benefit from the simple yet extensible process of preparing and transmitted data described above.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

We claim:

1. A method of transferring media between a source device and a receiving device comprising:

assembling a prologue string of a data stream, the prologue string being the first data unit in the data stream, the prologue string indicating a format of a remaining portion of the data stream, the prologue string defining a relationship between a plurality of content files and their respective content metadata that make up the remaining portion of the data stream, the prologue string including a root item type indicator and a total number to count, wherein the root item type indicator defines a metadata stack including a plurality of hierarchal attributes, each hierarchal attribute having a respective level of hierarchy that specifies a hierarchal relation of the content metadata to each other;

sending the prologue string to the receiving device;

assembling a plurality of metadata strings according to the metadata stack of the prologue string, wherein the plurality of metadata strings describe at least a part of the metadata stack, wherein each metadata string of the plurality of metadata strings corresponds to a hierarchal attribute of the plurality of hierarchal attributes, and each metadata string identifies aspects of a hierarchal attribute of the plurality of hierarchal attributes assigned to the respective level of the hierarchy of the media, wherein at least one of the plurality of the metadata strings has a count indicator that designates at least the one of the plurality of the metadata strings is countable against the total number to count, to form an assembled plurality of metadata strings;

sending at least the one of the assembled metadata strings to the receiving device, to form a sent metadata string;

assembling a content file associated with the sent metadata string, to form an associated content file;

sending the associated content file to the receiving device;

repeating the sending of any remaining portion of the assembled plurality of metadata strings and remaining associated content file of the media to the receiving device, to form a plurality of sent metadata strings and sent content files that make up the remaining portion of the data stream;

determining when attribute information of a corresponding hierarchal attribute at the same respective level of hierarchy of the respective content metadata is duplicated in the assembled plurality of metadata strings and identifying that attribute information as a duplicated attribute information; and deleting the duplicated attribute information from the assembled plurality of metadata strings.

2. The method of claim 1, wherein at least one of the assembled plurality of metadata strings includes a first separator between a first name/value pair and a second name/value pair of a plurality of name/value pairs and a second separator between a name and a value of each name/value pair.

3. The method of claim 2, wherein at least one of the assembled plurality of the metadata strings includes a unique identifier, at least one type identifier, and at least one name identifier.

4. The method of claim 1, wherein at least one of the assembled plurality of the metadata strings comprises one of
a METAXFER_ENCODE_HMEDIAITEM;
a METAXFER_ENCODE_MEDIAITEMROOT;
a METAXFER_ENCODE_MEDIAITEMTYPE; and
a METAXFER_ENCODE_RELATION.

5. The method of claim 1, wherein at least one of the assembled plurality of the metadata strings is a URL, name, an artist, an album, a genre, a track number, a copyright notice, a source, a star rating, a playcount, a channel number, an origin date, a synchronization date, a duration, a picture flag, a picture height and width dimension, a description, a media format, an index, a display URL, a sort key, a hidden flag, or a stocking kit unit (SKU) identifier.

6. The method of claim 1, wherein the prologue string is a description of a root component or an identifier configured to identify optional information of the sending device.

7. The method of claim 1, further comprising:
receiving the prologue string at the receiving device;
receiving the metadata string with the count indicator at the receiving device;
receiving the associated content file; and
setting a user interface element according to the total number to count in the prologue string and a progress number indicating how many of the sent metadata strings having the count indicator have been received.

8. The method of claim 7, further comprising using a received metadata string to set a relationship to a previously received metadata string from the current step of sending at least the one metadata string.

9. The method of claim 7, further comprising using the received metadata string to set a relationship for a received content file to a previously sent metadata string.

10. The method of claim 7, further comprising parsing a received metadata string into name/value pairs.

11. The method of claim 10, further comprising blocking an item from presentation to a user when a name/value pair indicates the content file is hidden.

12. The method of claim 1, further comprising:
assigning the count indicator or a not-count indicator to each attribute of the plurality of hierarchal attributes via the corresponding metadata string of the plurality of metadata strings that make up at least a part of the metadata stack-and each of the associated content files;
calculating the total number to count;
wherein the metadata strings and associated content files having the count indicator are used to indicate a progress count of the received attributes against the total number to count.

13. The method of claim 1, further comprising:
assigning the count indicator or a not-count indicator to each non-duplicate attribute of the plurality of hierarchal attributes via the corresponding metadata string of the plurality of metadata strings that make up at least a part of the metadata stack and each of the associated content files;
calculating the total number to count;
wherein the metadata strings and associated content files having the count indicator are used to indicate a progress count of the received attributes against the total number to count.

14. The method of claim 1, further comprising:
changing lower level attributes which previously pointed to duplicated attribute information to point to an adjacent higher level attribute which is adjacent to the attribute of the deleted duplicated attribute information.

15. A computer storage media having a sequence of instructions which, when executed by a processor of a media device, causes the processor to execute a process for transferring media, the process comprising:
assembling a prologue string of a data stream, the prologue string being the first data unit in the data stream, the prologue string indicating a format of a remaining portion of the data stream, the prologue string defining a relationship between a plurality of content files and their respective content metadata that make up the remaining portion of the data stream, the prologue string including a root item type indicator and a total number to count, wherein the root item type indicator defines a metadata stack including a plurality of hierarchal attributes, each hierarchal attribute having a respective level of hierarchy that specifies a hierarchal relation of the content metadata to each other;
sending the prologue string to the receiving device;
assembling a plurality of metadata strings according to the metadata stack of the prologue string, wherein the plurality of metadata strings describe at least a part of the metadata stack, wherein each metadata string of the plurality of metadata strings corresponds to a hierarchal attribute of the plurality of hierarchal attributes, and each metadata string identifies aspects of a hierarchal attribute of the plurality of hierarchal attributes assigned to the respective level of the hierarchy of the media, wherein at least one of the plurality of the metadata strings has a count indicator that designates at least the one of the plurality of the metadata strings is countable against the total number to count, to form an assembled plurality of metadata strings;
sending at least the one of the assembled metadata strings to the receiving device, to form a sent metadata string;
assembling a content file associated with the sent metadata string, to form an associated content file;
sending the associated content file to the receiving device; and
repeating the sending of any remaining portion of the of the assembled plurality of metadata strings and remaining associated content file of the media to the receiving device, to form a plurality of sent metadata strings and sent content files that make up the remaining portion of the data stream; and
determining when attribute information of a corresponding hierarchal attribute at the same respective level of hierarchy of the respective content metadata is duplicated in the assembled plurality of metadata strings and identifying that attribute information as a duplicated attribute information; and
deleting the duplicated attribute information from the assembled plurality of metadata strings.

16. The computer storage media of claim 15, wherein at least one of the assembled plurality of metadata strings includes a first separator between a first name/value pair and a second name/value pair of a plurality of name/value pairs and a second separator between a name and a value of each name/value pair.

17. The computer storage media of claim 16, wherein at least one of the assembled plurality of the metadata strings includes a unique identifier, at least one type identifier, and at least one name identifier.

18. The computer storage media of claim 15, further comprising:
   assigning the count indicator or a not-count indicator to each attribute of the plurality of hierarchal attributes via the corresponding metadata string of the plurality of metadata strings that make up at least a part of the metadata stack and each of the associated content files;
   calculating the total number to count;
   wherein the metadata strings and associated content files having the count indicator are used to indicate a progress count of the received attributes against the total number to count.

19. The computer storage media of claim 15, further comprising:
   assigning the count indicator or a not-count indicator to each non-duplicate attribute of the plurality of hierarchal attributes via the corresponding metadata string of the plurality of metadata strings that make up at least a part of the metadata stack and each of the associated content files;
   calculating the total number to count;
   wherein the metadata strings and associated content files having the count indicator are used to indicate a progress count of the received attributes against the total number to count.

20. The computer storage media of claim 15, further comprising:
   changing lower level attributes which previously pointed to duplicated attribute information to point to an adjacent higher level attribute which is adjacent to the attribute of the deleted duplicated attribute information.

* * * * *